(12) United States Patent
White

(10) Patent No.: US 9,236,781 B2
(45) Date of Patent: Jan. 12, 2016

(54) PLANETARY GEAR ASSEMBLY

(71) Applicant: National Oilwell Varco, L.P., Houston, TX (US)

(72) Inventor: William Benjamin White, Bedford, TX (US)

(73) Assignee: National Oilwell Varco, L.P., Houston, TX (US)

( * ) Notice: Subject to any disclaimer, the term of this patent is extended or adjusted under 35 U.S.C. 154(b) by 56 days.

(21) Appl. No.: 14/086,788

(22) Filed: Nov. 21, 2013

(65) Prior Publication Data

US 2015/0141190 A1 May 21, 2015

(51) Int. Cl.
*F16H 1/28* (2006.01)
*H02K 7/116* (2006.01)
*B66D 1/24* (2006.01)
*E21B 19/22* (2006.01)

(52) U.S. Cl.
CPC *H02K 7/116* (2013.01); *B66D 1/24* (2013.01); *E21B 19/22* (2013.01); *F16H 1/28* (2013.01)

(58) Field of Classification Search
CPC .......... F16H 1/28; B65H 79/00; B65H 75/30; B65H 75/34; E21B 19/008; E21B 19/08; E21B 19/20; E21B 19/22
USPC .......................................... 180/372; 475/331
See application file for complete search history.

(56) References Cited

U.S. PATENT DOCUMENTS

| | | | | |
|---|---|---|---|---|
| 3,076,635 | A * | 2/1963 | Bowden | 254/272 |
| 3,352,178 | A * | 11/1967 | Lindgren et al. | 475/343 |
| 4,254,669 | A * | 3/1981 | Schulz | 475/329 |
| 4,517,858 | A * | 5/1985 | Schafer | 475/337 |
| 4,846,631 | A * | 7/1989 | Parrott | 417/273 |
| 4,848,663 | A * | 7/1989 | Sherbrooke | 239/265.19 |
| 5,309,990 | A | 5/1994 | Lance | |
| 5,655,988 | A * | 8/1997 | Schnell | 475/341 |
| 5,797,185 | A | 8/1998 | Sammataro et al. | |
| 6,059,029 | A | 5/2000 | Goode | |
| 6,173,769 | B1 | 1/2001 | Goode | |

(Continued)

FOREIGN PATENT DOCUMENTS

| | | |
|---|---|---|
| DE | 10-2009-034833 A1 | 2/2011 |
| EP | 1439324 A2 | 7/2004 |

(Continued)

OTHER PUBLICATIONS

International Search Report and Written Opinion of the International Searching Authority received in Patent Cooperation Treaty Application No. PCT/US14/066711, mailed Aug. 27, 2015, 12 pages.

*Primary Examiner* — Sherry Estremsky

(74) *Attorney, Agent, or Firm* — Marc A. Hubbard; Hubbard Law, PLLC

(57) ABSTRACT

A modified planetary gear box and arrangement of the gear box with a drive motor permits electrical, optical or other types of cabling or wiring to be passed through the planetary gear box along its axis of rotation. The planetary gear box drives or rotates a reel of coiled tubing. Electrical, hydraulic, optical and other types of line for lowering into a well bore through the coiled tubing is passed through a passageway through the center of the planetary gear box, into one end of a hub of the reel, and then into the coiled tubing, which is injected into the wellbore. The other end of the hub of the reel is able to be connected to a swivel joint that can be connected to a pump for pumping fluid into the coiled tubing.

18 Claims, 3 Drawing Sheets

(56) References Cited

U.S. PATENT DOCUMENTS

| | | | |
|---|---|---|---|
| 6,537,167 B1 * | 3/2003 | Gazyakan et al. | 475/5 |
| 6,648,000 B2 | 11/2003 | Cain et al. | |
| 6,672,529 B2 | 1/2004 | Cain et al. | |
| 7,810,574 B2 * | 10/2010 | Stukey et al. | 166/384 |
| 8,808,133 B2 * | 8/2014 | Carlton et al. | 475/263 |
| 2010/0007151 A1 | 1/2010 | Ciszak et al. | |
| 2011/0100715 A1 | 5/2011 | Kolle et al. | |
| 2012/0247579 A1 * | 10/2012 | Park | 137/355.26 |

FOREIGN PATENT DOCUMENTS

| | | |
|---|---|---|
| EP | 1693599 A1 | 8/2006 |
| JP | 2011-027245 A | 2/2011 |
| WO | 2013/158096 A1 | 10/2013 |

* cited by examiner

PLANETARY GEAR ASSEMBLY

FIELD OF INVENTION

The invention relates generally to planetary gears, and more particularly to reels carrying coiled tubing for coiled tubing injectors and similar mechanisms driven by a planetary gearing system.

BACKGROUND

Coiled tubing well intervention has been known in the oil production industry for many years. A great length, often exceeding 15,000 feet of steel tubing, is handled by coiling it on a large reel, which explains the name of coiled tubing. The tubing reel cannot be used as a winch drum. The stresses involved in using it as a winch would destroy the tubing. The accepted solution in the oil industry is to pull tubing from the reel as it is required and pass it around a curved guide arch so that it lies on a common vertical axis with the well bore. To move the tubing into and out of the well bore, a device called a coiled tubing injector is temporarily mounted on the wellhead, beneath the guide arch. Examples of coiled tubing injectors include those shown and described in U.S. Pat. Nos. 5,309,990, 6,059,029, and 6,173,769, all of which are incorporated herein by reference.

Coiling tension is controlled by a tubing reel drive system and remains approximately constant no matter if the injector head is running tubing into or out of the well, or if it is pulling or snubbing. The coiling tension is insignificant by comparison to tubing weight and payload carried by the tubing in the well bore and therefore is no danger to the integrity of the tubing.

Although other methods of achieving this aim are known, injector heads used for well intervention and drilling utilize a plurality of chain loops, on which are mounted grippers for gripping the tubing. There are many examples of such injector heads. Most rely on roller chains and matching sprocket forms as a means of transmitting drive from the driving shafts to the chain loop assemblies. For the injector head to manipulate tubing, it pushes, from opposite sides, the grippers against the tubing and then concurrently moves the grippers by rotating to move the tubing in and out of the well bore.

A coiled tubing reel assembly includes a stand for supporting a spool on which tubing is stored, a drive system for rotating the reel and creating back-tension during operation of the reel, and a "level winding" system that guides the tubing as it is being unwound from and wound onto the spool. The level winding system moves the tubing laterally across the reel so that the tubing is laid across the reel in a neat and organized fashion. The coiled tubing reel assembly must rotate the spool to feed tubing to and from the injector and well bore. The tubing reel assembly must also tension the tubing by always pulling against the injector during normal operation. The injector must pull against the tension to take the tubing from the tubing reel, and the reel must have sufficient pulling force and speed to keep up with the injector and maintain tension on the tubing as the tubing is being pulled out of the well bore by the injector. The tension on the tubing is always being maintained in an amount sufficient to wind properly the tubing on the spool and to keep the tubing wound on the spool.

Although a spool can be rotated by means of a chain and a sprocket mounted on the axle of the coiled tubing spool, planetary gear drives are typically used to rotate the spool. A planetary gear drive is capable of delivering high torque at low speeds without the heaviness and expense of a chain and sprocket. Closed center planetary gear drives are usually preferred. Such drives have all of their components mounted symmetrically about the center of rotation, including the drive motor, which may be electric or hydraulic.

In a typical arrangement, the output of a planetary gear drive supports one end of the reel, connecting directly to the axle of the reel. Integral brakes are usually fitted to the planetary drive to provide a parking brake for preventing unwinding of the stored tubing when the drive motor is not powered. Planetary gearing is also referred to as epicyclic gearing. Planetary gearing comprises one or more gears, called planet gears, that revolve around a central gear called a sun gear. The planet gears are mounted to a carrier, which may rotate relative to the sun gear. An outer gearing, called an annulus, meshes with the planet gear. Planetary gearing may be either simple or compound. A simple planetary gear has one sun, one ring, one carrier and one set of planet gears. A compound planetary gearing has a more complex structure. There exist many examples of compound structures too numerous to list. In a coiled tubing reel application, the planetary gear drive functions as reduction gearing that takes a relatively high speed, low-torque input, such as from a hydraulic motor, and provides a relatively low speed, high-torque output that is coupled with the hub of the reel, with the input to the planetary gearing rotating about the same axis as its output and the spool.

A fluid swivel connects to the other end of the axle of the reel for coupling a fluid source to the coiled tubing wound on the reel. Because the planetary gear drive is connected to one end of the spool's central axle, and the fluid axle is connected to the other end, a concentric rotary union or a slip ring assembly is used to run electrical and other wires into the coiled tubing for transmitting electrical signals to and from sensors and other equipment connected to the end of the coiled tubing. The concentric rotary union must have a sufficiently large internal hub that can be bored out to pass over the axle of the reel. Alternately, to avoid having to incorporate concentric rotary ring, a chain and sprocket is used.

SUMMARY

The invention pertains generally to a modified planetary gear box or drive and arrangement of the gear box with a drive motor that permits electrical, optical, hydraulic or other types of cabling, wiring, or lines to be passed through the planetary gear box. When the planetary gear is connected to one end of a reel of coiled tubing, cabling is able to be passed through the planetary gear box directly into one end of a hub of the reel, and then into the end of the coiled tubing that is being injected into a wellbore, while the other end of the reel's hub is connected to a swivel joint that can be connected to a pump for pumping fluid into the coiled tubing.

In one representative embodiment, a conduit extends through the center of the planetary gear box housing and its sun gear, the axis of the conduit being aligned with the axis of rotation of the input to the planetary gear box and to its output, the output being coupled to the axle of, for example, a coiled tubing reel. An output shaft of a drive motor that is offset from the central axis of the planetary gear is coupled to the rotary input of the planetary gear box through, for example, one or more gears, chains, or other means for coupling the output shaft of the drive motor to the input of the planetary gear box.

DETAILED DESCRIPTION OF EXEMPLARY EMBODIMENTS

Figure 1:
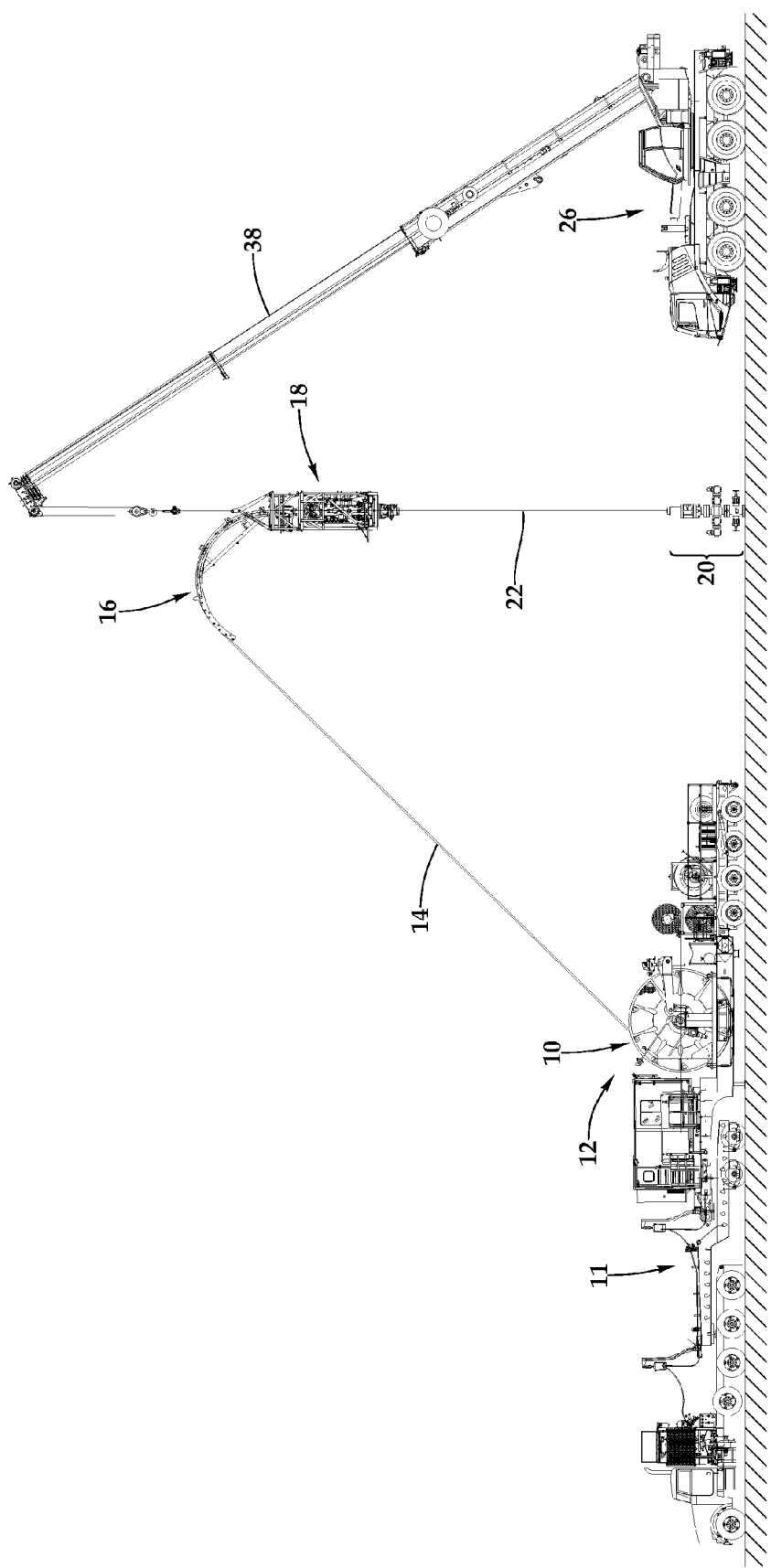
FIG. 1 is a side view of a representative example of a coiled tubing unit deployed at a well site, with a cooled tubing reel assembly mounted on a trailer feeding coiled tubing into a coiled tubing injector connected to a riser on top of a well head.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the invention. In the drawings and description that follow, like parts are typically marked throughout the specification and drawings with the same reference numerals, respectively. The drawing figures may not be to scale. Certain features of the invention may be shown exaggerated in scale or in a schematic form, and details of conventional elements may be omitted in the interest of clarity and conciseness. The terms "including" and "comprising" are meant to be inclusive or open-ended, and not exclusive. Unless otherwise indicated, as used throughout this document, "or" does not require mutual exclusivity.

Unless otherwise specified, any use of any form of the terms "connect," "engage," "couple," "attach," or any other term describing an interaction between elements is not meant to limit the interaction to direct contact between the elements unless the context plainly states otherwise. It may include indirect interaction between the elements. The phrases "hydraulically coupled," "hydraulically connected," "in hydraulic communication," "fluidly coupled," "fluidly connected," and "in fluid communication" refer to a form of coupling, connection, or communication related to fluids, and the corresponding flows or pressures associated with these fluids. Reference to a fluid coupling, connection, or communication between two components describes an arrangement that allows fluid to flow between or among the components. Hydraulically coupled, connected, or communicating components may include certain arrangements where fluid does not flow between the components, but in which fluid pressure may be transmitted such as via a diaphragm or piston. Similarly, electrical coupling, connection, or communication between two or more components describes an arrangement that allows for transmission of information between the components by one or more electrical circuits or electro-magnetic waves. The terms "seal", "sealing", "sealing engagement," and "sealingly-coupled" are not intended to imply, unless the context otherwise states, formation of a perfect seal or a seal that works under all circumstances.

FIG. 1 illustrates one example of a coiled tubing injector unit. The example is not intended to be limiting. It is intended to be representative generally of coiled tubing injector units and their components. A reel 10 of coiled tubing is mounted on a trailer 11 for transport to the site. A coiled tubing injector, control cabin and other equipment for operating the injector is sometimes referred to collectively as a "coiled tubing unit," and is generally designated in the figures by the reference number 12. As coiled tubing 14 is unspooled from the reel, or is spooled back onto the reel, it is guided into alignment with the chains of the coiled tubing injector by a tubing support guide 16. Because such guides are typically arched, they are sometimes referred to as "gooseneck" supports. When the coiled tubing injector is deployed, the guide is connected to the frame of the coiled tubing injector so that it has a fixed relationship with the coiled tubing injector while the injector is being operated. Generally, the guidance arch is positioned or oriented so that the coiled tubing is threaded into the top of the head of the injector, between its rotating chains or, optionally, into a straightener mounted to the frame, on top of the injector head, for removing the bend in the tubing before it enters the injector head. (As used in this description, "coiled tubing injector" refers to the injector head with or without the straightener, unless the context indicates otherwise.) The reel must maintain tension on the coiled tubing in order to wind the tubing coiled on the reel and to keep it wound on the reel, as it is being unspooled or spooled. The guidance arch prevents the coiled tubing from kinking or otherwise being damaged by the tension the reel is applying to the tubing. However, a guidance arch is typically attached to the frame of the coiled tubing injector in a manner that allows it to be attached or connected in different positions or orientations. For example, the best positioning or orientation may depend on the diameter of tubing being used and whether the tubing is being lowered or pushed into the well bore or pulled out of the well bore. When the pipe is coming off a reel, it has relatively more curve than when it is pulled from the well, which may affect how the guidance arch is fixed to the injector. Thus, "fixed relationship" does not imply one that cannot allow for adjustment.

When being used, the coiled tubing injector is positioned over the well head, high enough to accommodate one or more blow out preventers 20, a riser 22, and other equipment that might be connected to the wellhead through which the coiled tubing must pass before entering the well bore. The riser is made up from one or more sections of straight pipe that extends from the blow out preventers attached to the wellhead. The riser is used to accommodate elongated, rigid tools that are attached to the end of the coiled tubing prior to being lowered into the well bore. The coiled tubing injector is connected to the riser with a stripper, through which the coiled tubing is pushed or pulled. Because there is no derrick or platform, a temporary structure erected above the wellhead, or a mobile crane driven to the site, is used to position and hold the injector in place.

A coiled tubing reel assembly includes a stand for supporting a spool on which tubing is stored, a drive system for rotating the reel and creating back-tension during operation of the reel, and a "level winding" system that guides the tubing as it is being unwound from and wound onto the spool. The level winding system moves the tubing laterally across the reel so that the tubing is laid across the reel in a neat and organized fashion. The coiled tubing reel assembly must rotate the spool to feed tubing to and from the injector and well bore. The tubing reel assembly must also tension the tubing by always pulling against the injector during normal operation. The injector must pull against the tension to take the tubing from the tubing reel, and the reel must have sufficient pulling force and speed to keep up with the injector and maintain tension on the tubing as the tubing is being pulled out of the well bore by the injector. The tension on the tubing must always be maintained. The tension must also be sufficient to wind properly the tubing on the spool and to keep the tubing wound on the spool. Consequently, a coiled tubing reel assembly is subject to substantial forces and loads. Historically, tubing reel assemblies have been shipped to wells with the required coiled tubing wound on the spool, and the spool installed in a reel assembly. Such spools are specially designed for the particular reel assembly and typically not meant to be disconnected or removed from the reel assembly during normal operation. However, systems exist that permit spools from being removed from reel assemblies, such as the ones shown in U.S. Pat. No. 6,672,529, which is incorporated herein by reference.

A high capacity, self-propelled crane 26 is used to lift and hold the coiled tubing injector 18 and guidance arch in the proper position during the well servicing job. The crane is generally placed opposite the wellhead of the coiled tubing reel 10 or, if necessary, to one side. Some or all of the weight of the injector and the tubing is transferred to the boom of the crane.

Figure 2:
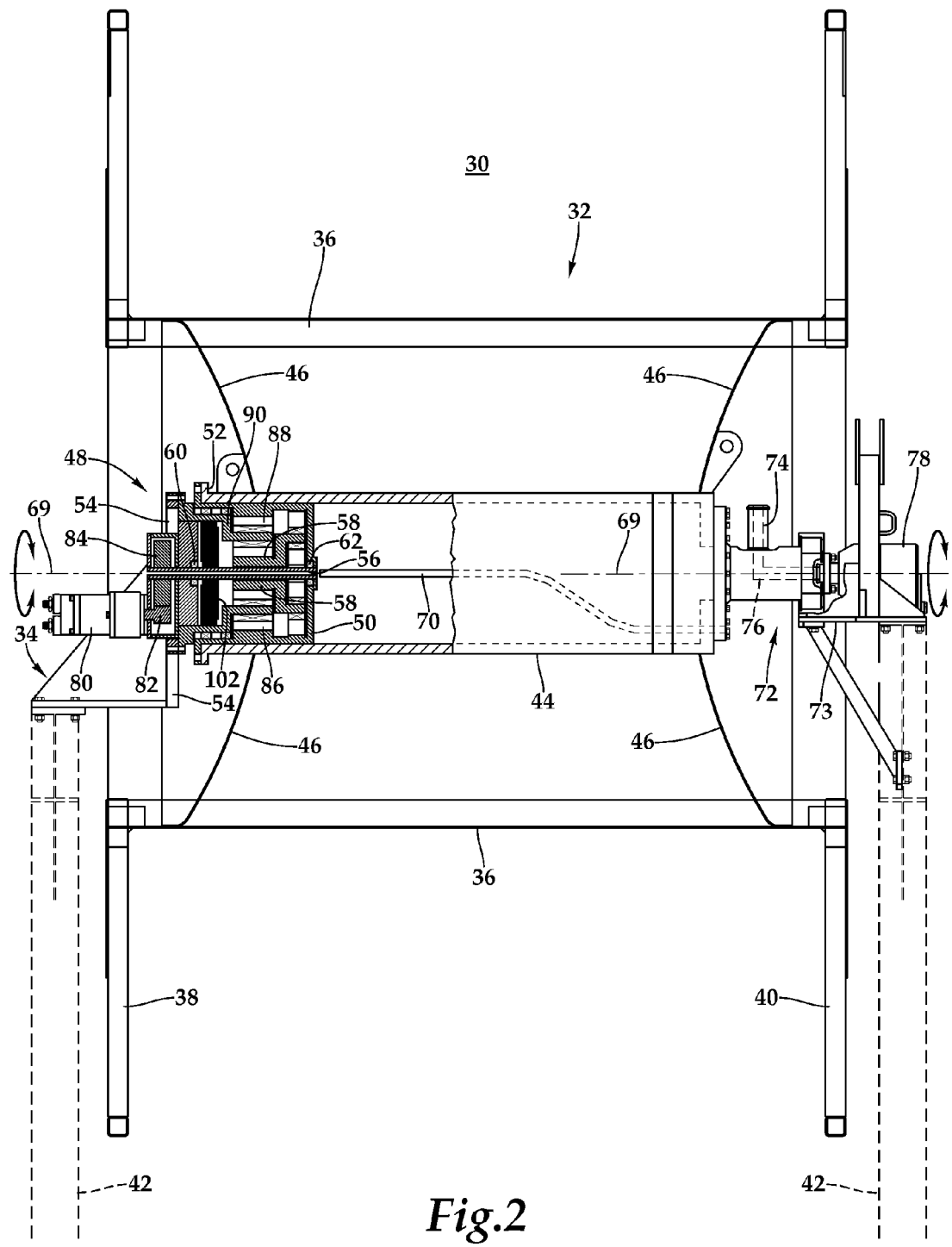
FIG. 2 is a side view, partially section, of a coiled tubing reel comprising a stand and spool.
Figure 3:
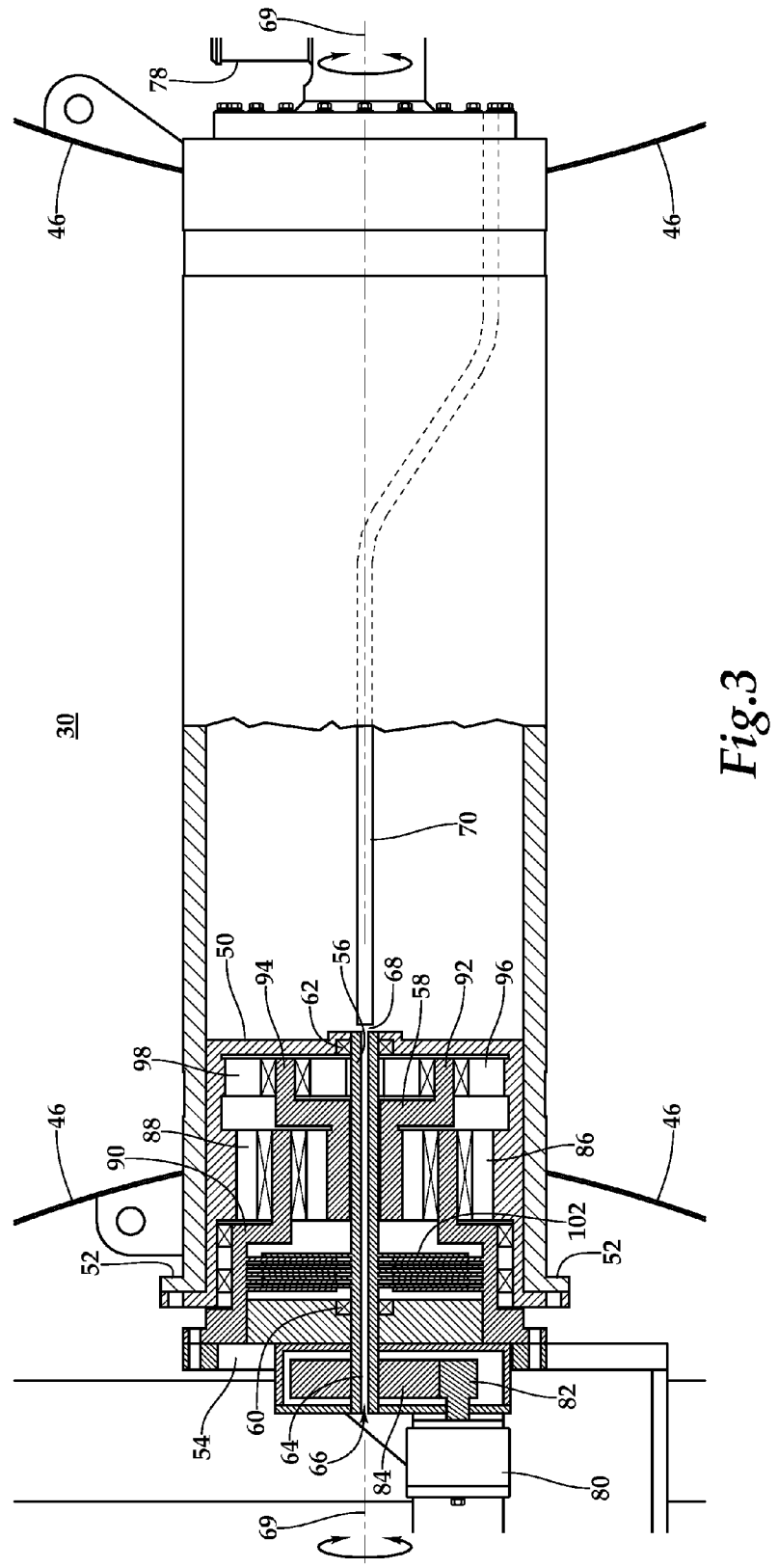
FIG. 3 is an enlarged portion of the side view of FIG. 2 showing the details of a planetary gear drive.

FIGS. 2 & 3 are partially-sectioned side views of a representative example of a coiled tubing reel assembly with a planetary gear drive. No coiled tubing is shown wrapped around the reel in this figure. It has been omitted to show details of the hub of the reel. The reel assembly 30 includes a spool 32 mounted on a stand that is generally indicated by reference number 34. The spool is comprised of central section, or drum 36, a left flange or rim 38 and a right flange or rim 40. The stand is comprised of a frame 42 (partially illustrated). The drum is connected to a central hub by a framework 46 of struts. The hub 44 has a hollow, cylindrical shape in this example. It rotates with the spool. The hub 44 is supported on the frame 42 of the stand at opposite ends so that it may rotate on the stand when turned.

A planetary gearing drive, which is generally designated by reference number 48, is mounted directly within one end of hub 44. An outer housing 50 of the planetary gear drive, functioning as its output, is connected with the hub 44 in this example by fitting it inside an open end of the hub and connecting it to an end flange 52. The planetary gear drive 48 is connected to the stand at flange 54, which is part of frame 42. The input to the planetary drive is a shaft 56 that is connected to a sun gear 58. The shaft 56 rotates the sun gear. It is supported by front radial bearing 60 and rear radial bearing 62. The shaft extends from one side of the planetary gear box drive to the other. Through the center of the shaft is formed a hollow passageway or conduit 64, with an outside or front opening 66 and an inside or rear opening 68. Although indicated as a single piece, the drive shaft may be comprised of multiple, co-axial elements that rotate together and collectively form a conduit that defines a single passageway that extends along the axis of rotation of the planetary gear drive, which is adapted or otherwise suitable for passing an electrical or optical cable from the one side the planetary gear to the other side of the planetary gear along its central axis of rotation. The central axis of rotation of the planetary gear is coincident with the central axis of rotation the spool 32 (and hub 44), which is indicated by dashed line 69. A conduit may, therefore, be comprised of one or more structural pieces or segments. The term "conduit" is not intended to imply a single length of pipe. Although not shown, an electrical cable, hydraulic control line, or optical cable (collectively, each a "line") used for powering or controlling a downhole tool, or transmitting signals from a sensor can be fed through conduit 64 for insertion into one end of coiled tubing (not shown) wrapped around the spool 32. A conduit 70 may be used to direct the line toward the opposite side of the hub, at which point the line would exit and be fed into the open end of the coiled tubing, which would not be attached to outlet 74. Alternately, the line can be threaded or inserted through an arrangement (not shown) that attaches to outlet 74 of fluid axle 72 and permits either the line to be fed into, or fluid to be pumped through, the coiled tubing, or both. The line could also be used to power or control devices on the spool 32 such as a valve for closing the connection between the coiled tubing and the fluid axle 72.

The other end of hub 44 is attached to fluid axle 72. The fluid axle is mounted to frame 42 of the stand on flange 73. Coiled tubing may be attached to outlet 74 of pipe 76 to allow for fluid to be pumped through the coiled tubing. Pipe 76 couples to a swivel joint 78 so that it may rotate with respect to the joint. A source of high pressure fluid outside of the reel is connected to the stationary side of the swivel joint 78.

Drive motor 80 is coupled to the input shaft 56. The drive motor is offset to form the axis of the input shaft 56, allowing access to opening 66 of conduit 64. The drive motor is, in this example, coupled to the input shaft by a gear train comprised of gears 82 and 84. Gear 82 is connected to an output shaft of drive motor 80, and gear 84 is connected to the input shaft 56. In this example, the gears form a reduction gear train that reduces speed and increases torque on the input shaft 56. Optionally, more than one drive motor may be utilized by arranging the drive motors around the input shaft 56, each placed to one side of the axis of rotation of the input shaft in an arrayed fashion, with each of them coupled to the input shaft through a gear train. The drive motors may be hydraulic and/or electric.

Rotation of the drive motor turns input shaft 56, which turns sun gear 58. Sun gear 58 rotates planetary gears 86 and 88. The planetary drive may have, optionally, have just one planet gear. It may also have more than two planet gears. In this example, the planetary gears are rotationally mounted on arms of a carrier 90, which is connected to flange 54 of the frame 42. Connected, or integrally formed with, sun gear 58 is a carrier with at least two arms 92 and 94. Planet gears 96 and 98 are mounted, respectively, on the arms 92 and 94. The planetary gears 86, 88, 96 and 98 mesh with an annulus or outer gearing formed on the side of housing 50, causing it to rotate when the input shaft is rotated. Integrated into the planetary gear drive 48 is a brake 102. One part of the brake is mounted to input shaft 56 and the other to the stationary carrier 90.

The drawing of planetary gear drive 48 is a simplified to show representative elements of a planetary drive. It is just one example of compound planetary gearing. It is intended to be merely representative, and not an limiting example, of planetary gear drives or boxes generally for purposes of illustrating basic principles of operation and a conduit 66 extending through the center of the planetary gearing arrangement to allow passage of a cable or wiring.

In an alternate embodiment, the reel stand assembly is modified to include a coupling between the spool and the stand to allow for the spool to be removed relatively more quickly from the stand. In such an embodiment, the planetary drive is connected to an outer coupling member (such as an axle) and the hub of the spool being connected to an interior coupling member. An extension of conduit or passageway 66, which is coaxial with the planetary gearing, extends through both parts of the coupling, along their respective axes of rotation, and into the hub of the spool.

The foregoing description is of exemplary and preferred embodiments. The invention, as defined by the appended claims, is not limited to the described embodiments. Alterations and modifications to the disclosed embodiments may be made without departing from the invention. The meaning of the terms used in this specification are, unless expressly stated otherwise, intended to have ordinary and customary meaning and are not intended to be limited to the details of the illustrated structures or embodiments.

What is claimed is:

1. A drive assembly, comprising:
   a planetary gear box having at least one stage, the planetary gear box comprising an input shaft coupled with a sun gear and a rotational output coupled with an annular gear, the sun gear and annular gear being coupled through at least a plurality of planetary gears; wherein the input shaft and output each are rotatable about a common axis and the input shaft extends through a front side of the gear box;
   a hollow passageway extending through the input shaft from the front side of the planetary gear box to a back side of the planetary gear box opposite the front side of the planetary gear box, with openings at each end of the passageway; and
   at least one motor coupled to the input shaft exterior of the planetary gear box, the at least one motor being offset from the common axis of the planetary gear box, in a position that does not obscure the opening of the passageway on the front side of the planetary gear box.

2. The drive assembly of claim 1, further comprising at least one electrical, hydraulic or optical line extending through the passageway.

3. The drive assembly of claim 2, wherein the at least one motor is coupled to the input of the planetary gear box through one or more gears.

4. The drive assembly of claim 3, further comprising a plurality of motors coupled with the input shaft through a plurality of gears, each motor being offset from the common axis of the planetary gear box in a position that does not obscure the opening of the passageway.

5. The drive assembly of claim 1, wherein the hollow passageway is formed at least in part by a conduit having an axis that coincides with the common axis, the conduit being joined with the output for rotating with it.

6. The drive assembly of claim 5 wherein the output of the planetary gear box is comprised of a rotating cover opposite the rotational input, and the conduit is fixed to the cover.

7. A coiled tubing reel assembly, comprising
   a stand;
   a spool mounted for rotation on the stand and comprising a central hub for mounting the spool for rotation on the stand;
   a planetary gear box mounted to the stand, the planetary gear box having at least one stage and comprising a rotational input coupled with a sun gear, and a rotational output coupled with annual gear, the sun gear and the annual gear being coupled through at least one planetary gear, the input and output each rotatable about a common axis; wherein the output of the planetary gear box is coupled to one end of the hub and supports the spool for rotation on the stand;
   a hollow passageway extending through the planetary gear box along the common axis; and
   at least one motor coupled to the input shaft, the at least one motor being offset from the central axis of the planetary gear box, in a position that does not obscure the passageway.

8. The coiled tubing reel assembly claim 7, further comprising coiled tubing wrapped around the spool and at least one electrical, hydraulic or optical line extending into the input shaft, through the passageway, and into the central hub.

9. The coiled tubing reel assembly of claim 8, wherein the line further extends into the tubing wrapped on the coiled tubing spool.

10. The coiled tubing reel assembly of claim 7, wherein the at least one motor is coupled to the input of the planetary gear box through one or more gears.

11. The coiled tubing reel assembly of claim 10, wherein the hollow passageway is formed at least in part by a hollow conduit with a central axis that coincides with the axis of rotation of the output, the conduit being joined with the output for rotating with it.

12. The coiled tubing reel assembly of claim 11 wherein the output of the planetary gear box is comprised of a rotating housing, and the conduit is fixed to the housing.

13. The coiled tubing reel assembly of claim 7, further comprising an axle connected to the stand having a fluid passageway extending through it, the axle being coupled with an end of the hub opposite the end of the hub coupled with the planetary gear box for supporting the spool for rotation on the stand.

14. A method for inserting an electrical, hydraulic, or optical line through coiled tubing within a well bore, wherein the coiled tubing is unwound from a reel assembly and fed to a coiled tubing injector for inserting into a well bore, the reel assembly comprising,
   a stand;
   a spool mounted for rotation on the stand and comprising a central hub for mounting the spool for rotation on the stand;
   a planetary gear box mounted to the stand, the planetary gear box having at least one stage and comprising a rotational input coupled with a sun gear, and a rotational output is coupled with an annual gear, the sun gear and the annual gear being coupled through at least one planetary gear, the input and output each rotatable about a common axis; wherein the output of the planetary gear box is coupled to one end of the hub and supports the spool for rotation on the stand; and,
   at least one motor coupled to the input shaft, the at least one motor being offset from the common axis of the planetary gear box;
   wherein the method comprises,
   feeding the line through a hollow passageway extending through the planetary gear box along the common axis, into the central hub, and then into the coiled tubing wrapped around the spool; and
   applying torque to the at least one drive motor.

15. The method of claim 14, wherein the at least one motor is coupled to the input of the planetary gear box through one or more gears.

16. The method of claim 14, wherein the hollow passageway is formed at least in part by a conduit with a central axis that coincides with the common axis.

17. The method of claim 16 wherein the output of the planetary gear box is comprised of a rotating housing and the conduit is fixed to the housing.

18. The method of claim 17, further comprising an axle connected to the stand having a fluid passageway extending through it, the axle being coupled with an end of the hub opposite the end of the hub coupled with the planetary gear box for supporting the spool for rotation on the stand.

* * * * *